(12) United States Patent
Cucknell et al.

(10) Patent No.: US 7,118,152 B2
(45) Date of Patent: Oct. 10, 2006

(54) AUTOMOTIVE CARGO RESTRAINT AND SECURITY SCREEN

(75) Inventors: Alan Cucknell, Cambridge (GB); Iain Sabberton, Cambridge (GB); Peter Cauwood, Cambridge (GB); Julian Scarfe, Cambridge (GB); Jamie Norris, Hereford (GB); Neil Mason, Cambridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 11/069,215

(22) Filed: Mar. 1, 2005

(65) Prior Publication Data

US 2005/0248174 A1    Nov. 10, 2005

Related U.S. Application Data

(60) Provisional application No. 60/569,107, filed on May 7, 2004.

(51) Int. Cl.
*B60R 5/04* (2006.01)

(52) U.S. Cl. .................. 296/37.16; 296/24.43

(58) Field of Classification Search .......... 296/24.43, 296/24.44, 37.8, 37.16, 98, 100.01, 100.11, 296/100.12, 24.4; 160/270, 271, 273.1, 370.22; 410/130, 150; 224/539, 542, 545, 564
See application file for complete search history.

(56) References Cited

U.S. PATENT DOCUMENTS

| | | | | | |
|---|---|---|---|---|---|
| 3,891,263 | A | * | 6/1975 | Orsulak ................ | 296/24.43 |
| 4,168,094 | A | * | 9/1979 | Yagi .................... | 296/37.16 |
| 4,202,577 | A | * | 5/1980 | Breitschwerdt et al. .. | 296/24.43 |
| 4,502,674 | A | | 3/1985 | White ................. | 296/37.16 |
| 4,668,001 | A | * | 5/1987 | Okumura et al. ........ | 296/37.16 |
| 4,924,814 | A | | 5/1990 | Beaudet ................ | 119/96 |
| 5,011,208 | A | * | 4/1991 | Lewallen .............. | 296/37.16 |
| 5,224,748 | A | * | 7/1993 | Decker et al. .......... | 296/37.16 |
| 5,288,122 | A | * | 2/1994 | Pilhall ................. | 296/24.43 |
| 5,632,520 | A | * | 5/1997 | Butz .................... | 296/24.43 |
| 5,685,592 | A | * | 11/1997 | Heinz .................. | 296/37.16 |
| 5,711,568 | A | * | 1/1998 | Diem et al. ............ | 296/37.16 |
| 5,727,836 | A | * | 3/1998 | Hosoya ................. | 296/37.16 |
| 5,772,370 | A | * | 6/1998 | Moore .................. | 410/100 |
| 5,947,358 | A | | 9/1999 | Wieczorek ............. | 224/543 |

(Continued)

FOREIGN PATENT DOCUMENTS

GB    2248806    4/1992

(Continued)

*Primary Examiner*—D. Glenn Dayoan
*Assistant Examiner*—Paul Chenevert
(74) *Attorney, Agent, or Firm*—Gigette M. Bejin; Miller Lawgroup, PLLC (57) ABSTRACT

A screen system is stowed in a compact storage position at a forward part of the rear cargo area adjacent the floor. The screen is extendable from the storage position to provide multiple uses. A vertical orientation of the screen can provide a rear seat storage pocket at a half-height position or a barrier between the passenger compartment and the rear cargo area at a full-height position. Horizontal deployment of the screen will provide a cargo restraint device or a carpet protector. The screen can be connected to the support for the spring-loaded cylinder to create a wrap storage device for cargo positioned next to the spring-loaded cylinder. The cylinder can be re-oriented to an intermediate location within the cargo area to create with a vertical extension thereof a divider for the cargo area. The screen can also be utilized as a conventional elevated security cover for the cargo area.

13 Claims, 8 Drawing Sheets

U.S. PATENT DOCUMENTS

| | | | |
|---|---|---|---|
| 5,954,380 A * | 9/1999 | Ament et al. | 296/24.43 |
| 6,213,186 B1 | 4/2001 | Torres | 160/24 |
| 6,247,741 B1 * | 6/2001 | Seel et al. | 296/37.14 |
| 6,302,463 B1 | 10/2001 | Moore | 296/24.1 |
| 6,349,986 B1 | 2/2002 | Seel | 296/37.16 |
| 6,402,217 B1 * | 6/2002 | Ament et al. | 296/37.16 |
| 6,439,633 B1 * | 8/2002 | Nemoto | 296/37.14 |
| 6,461,090 B1 * | 10/2002 | Faber et al. | 410/100 |
| 6,598,921 B1 * | 7/2003 | Seel et al. | 296/24.43 |
| 6,616,389 B1 * | 9/2003 | Ament et al. | 410/118 |
| 6,715,973 B1 * | 4/2004 | Faber et al. | 410/100 |
| 6,725,807 B1 * | 4/2004 | Tapia | 119/496 |
| 6,921,119 B1 * | 7/2005 | Haspel et al. | 296/24.4 |
| 6,930,592 B1 * | 8/2005 | Schlecht et al. | 340/426.29 |
| 6,966,591 B1 * | 11/2005 | Schlecht | 296/37.16 |
| 2002/0030372 A1 * | 3/2002 | Moore et al. | 296/24.1 |
| 2002/0163220 A1 * | 11/2002 | Ament et al. | 296/37.16 |
| 2003/0015531 A1 | 1/2003 | Choi | 220/200 |
| 2003/0090119 A1 | 5/2003 | Bateman | 296/24.1 |
| 2004/0020956 A1 * | 2/2004 | Lobanoff | 224/497 |
| 2005/0012352 A1 * | 1/2005 | Sparrer et al. | 296/24.43 |
| 2005/0248174 A1 * | 11/2005 | Cucknell et al. | 296/37.16 |

FOREIGN PATENT DOCUMENTS

| | | | | |
|---|---|---|---|---|
| JP | 61075034 A | * | 4/1986 | 296/37.16 |
| JP | 01204836 A | * | 8/1989 | 296/37.16 |
| JP | 01204837 A | * | 8/1989 | 296/37.16 |

* cited by examiner

AUTOMOTIVE CARGO RESTRAINT AND SECURITY SCREEN

CROSS-REFERENCE TO RELATED APPLICATIONS

This application claims domestic priority on U.S. Provisional Patent Application Ser. No. 60/569,107, filed May 7, 2004, the contents of which are incorporated herein by reference.

FIELD OF THE INVENTION

This invention relates to a cargo restraint and security screen for the rear cargo area of an automobile and, more particularly, to a screen that is flexible in utilization to provide multiple solutions for an automobile.

BACKGROUND OF THE INVENTION

Security screens are often found in automobiles having a rear cargo storage area, such as sport utility vehicles. Such screens are typically mounted at the forward end of the rear cargo area at an elevated position to extend from the mounting to a fastening device at the rearward end of the rear cargo area to provide a cover for the rear cargo area. Such known screens are wound into a spring-loaded cylinder to be retractable into the cylinder in a compact storage configuration, or extended from the cylinder into a deployed configuration. Once disconnected from the fastening device, which is typically a slot molded into the sidewall of the rear cargo area, the spring-loaded cylinder retracts the screen into the storage configuration.

In U.S. Pat. No. 6,349,986, granted to Holger Seel on Feb. 26, 2002, the rear cargo security screen is also utilized as a barrier between the front passenger compartment and the rear cargo area by orienting the blind portion of the apparatus into a vertical orientation and attached to a mounting device adjacent the ceiling of the vehicle. The housing for the security screen apparatus is positioned at the conventional position at an elevated forward part of the rear cargo area.

In U.S. Patent Application Publication No. 2003/0090119, filed by Brian Batemen and published May 15, 2003, the vertically oriented barrier is also secured to two locations on the roof of the vehicle to divide the rear cargo area from the front passenger compartment. Similarly, a load restraining net is mounted to the rear seat of a vehicle in U.S. Pat. No. 6,302,463, granted on Oct. 16, 2001, to Donal Moore, et al. Different forms of vertically oriented divider barriers separating the front passenger compartment from the rear cargo area are shown in Great Britain Application Publication No. 2,248,806, filed by Stanley Sharpe and published on Apr. 22, 1992, and in U.S. Pat. No. 4,924,814, granted to Alain Beaudet on May 15, 1990.

In U.S. Pat. No. 5,947,358, issued to Joseph Wieczorek on Sep. 7, 1999, the security screen housing is oriented in a longitudinal manner along one side of the rear cargo area and extended transversely, instead of longitudinally, to provide an elevated privacy screen over the rear cargo area. Wieczorek does not teach a relocation of the housing to a lower central location where the extendible blind can be vertically extended to provide a longitudinal divider for the rear cargo area.

A multi-section security screen apparatus is depicted in U.S. Pat. No. 4,502,674, issued to James White on Mar. 5, 1985. A secondary section drops vertically as the primary section of the blind is extended generally horizontally across an upper section of the rear cargo area. The secondary section is not secured, but merely drapes down from the housing when the primary section is extended and retracts with the primary section into the housing for storage.

In U.S. Pat. No. 6,213,186, granted to Daniel Torres on Apr. 10, 2001, the housing of the security screen is formed with a rearward panel to help enclose the gap between the conventional housing, the extendible shade and the rear seat. Panels forming the top surfaces of trays allowing liquid to pass from objects on top of the panels into the trays below the panels are depicted in U.S. Patent Application Publication No. 2003/0015531, filed by Sangwon Choi and published on Jan. 23, 2003. The panels in the Choi publication are pivotally mounted to permit access to the tray immediately beneath the panel.

Accordingly, it would be desirable to provide a cargo restraint and security screen that would provide multiple uses, other than as an elevated horizontal privacy screen and/or a vertical barrier device between the front passenger compartment and the rear cargo area, to be selectively deployed within the rear cargo area of the vehicle.

SUMMARY OF THE INVENTION

It is an object of this invention to overcome the aforementioned disadvantages of the known prior art by providing a screen apparatus that can be selectively configured into one of multiple uses.

It is another object of this invention to provide a screen that can be selectively positioned in multiple orientations within the rear cargo area of an automobile.

It is an advantage of this invention that the privacy screen for rear cargo area of an automobile can be utilized in capacities other than as an elevated cover for the rear cargo area.

It is a feature of this invention that the screen can be vertically positioned to form a barrier between the rear cargo area and the forward passenger compartment of the vehicle.

It is another advantage of this invention that the vertical orientation of the screen performs the function of an animal screen to keep pets retained in the rear cargo area.

It is another feature of this invention that the screen can be positioned horizontally along the floor of the rear cargo area to provide protection for the carpet on the floor of the rear cargo area.

It is still another feature of this invention that the screen can be positioned in a vertical orientation at a less than full height to provide a cargo pocket for the rear seat of the passenger compartment.

It is still another advantage of this invention that the horizontal orientation of the screen next to the floor of the rear cargo area provides an additional function of being a cargo restraint for cargo placed between the screen and the floor of the rear cargo area.

It is yet another feature of this invention that the screen can be positioned to wrap cargo positioned next to the spring-loaded cylinder to connected to or adjacent to the spring-loaded cylinder to provide a wrap storage capability for the cargo.

It is yet another advantage of this invention that the screen can be utilized to isolate cargo within the rear cargo area from the remainder of the rear cargo area.

It is a further feature of this invention that the security screen can still be utilized as a security cover in an elevated horizontal position.

It is still another feature of this invention that a screen apparatus for the rear cargo area of a vehicle can be utilized as a cargo restraint.

It is still another advantage of this invention that the screen apparatus can provide thermal or optical insulation from the sun.

It is a further advantage of this invention that the orientation of the security cover as an elevated horizontal security screen can be accomplished with the spring-loaded cylinder located along the floor of the rear cargo area or with the spring-loaded cylinder positioned in a conventional elevated position.

It is still a further feature of this invention that the screen can be re-oriented in the rear cargo area to an intermediate position between the rear seat back and the rear cargo door to permit extension thereof in a vertical manner to provide a laterally extending rear cargo divider.

It is still another object of this invention to provide a screen apparatus that is deployed along the floor of the rear cargo area when the screen is retracted in a compact storage configuration.

It is still a further advantage of this invention that the positioning of the screen in the compact storage configuration along the floor of the rear cargo area permits the screen to be stowed discretely without interfering with the positioning of cargo in the rear cargo area.

It is yet another object of this invention to provide a screen apparatus that can be configured into multiple uses within the rear cargo area of a vehicle and which is durable in construction, inexpensive of manufacture, carefree of maintenance, facile in assemblage, and simple and effective in use.

These and other objects, features and advantages are accomplished according to the instant invention by providing a screen apparatus that is stowed in a compact storage configuration at a forward part of the rear cargo area adjacent the floor. The screen is extendable from the compact storage position to provide multiple uses. A vertical orientation of the screen can provide a rear seat storage pocket at a half-height position or a barrier between the passenger compartment and the rear cargo area at a full-height position. Horizontal deployment of the screen will provide a cargo restraint device or a carpet protector. The screen can be connected to the support for the spring-loaded cylinder to create a wrap storage device for cargo positioned next to the spring-loaded cylinder. The cylinder can be re-oriented to extend laterally at an intermediate location to create with a vertical extension thereof a divider for the cargo area. The screen can also be utilized as a conventional elevated security cover for the cargo area.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring to the drawings, a cargo restraint and security screen incorporating the principles of the instant invention can best be seen. The screen apparatus 10 is preferably retractably housed in a spring-loaded housing 12 (or other appropriate tensioning mechanism) in a conventional manner to permit extension of the screen 15 away from the housing 12 for deployment thereof and retraction into the housing 12 for a compact storage thereof, although the storage of the screen 15 might not be fully retracted into the housing 12. The housing 12 is supported into appropriately sized and configured supports 20 molded into, or attached to, the sidewalls 17 of the rear cargo storage area 16. Preferably, the supports 20 are molded into the plastic inner sidewalls 17 of the rear cargo storage area 16 at a position to locate the housing 12 along the floor 18 at the forwardmost part of the rear cargo area 16.

Figure 1:
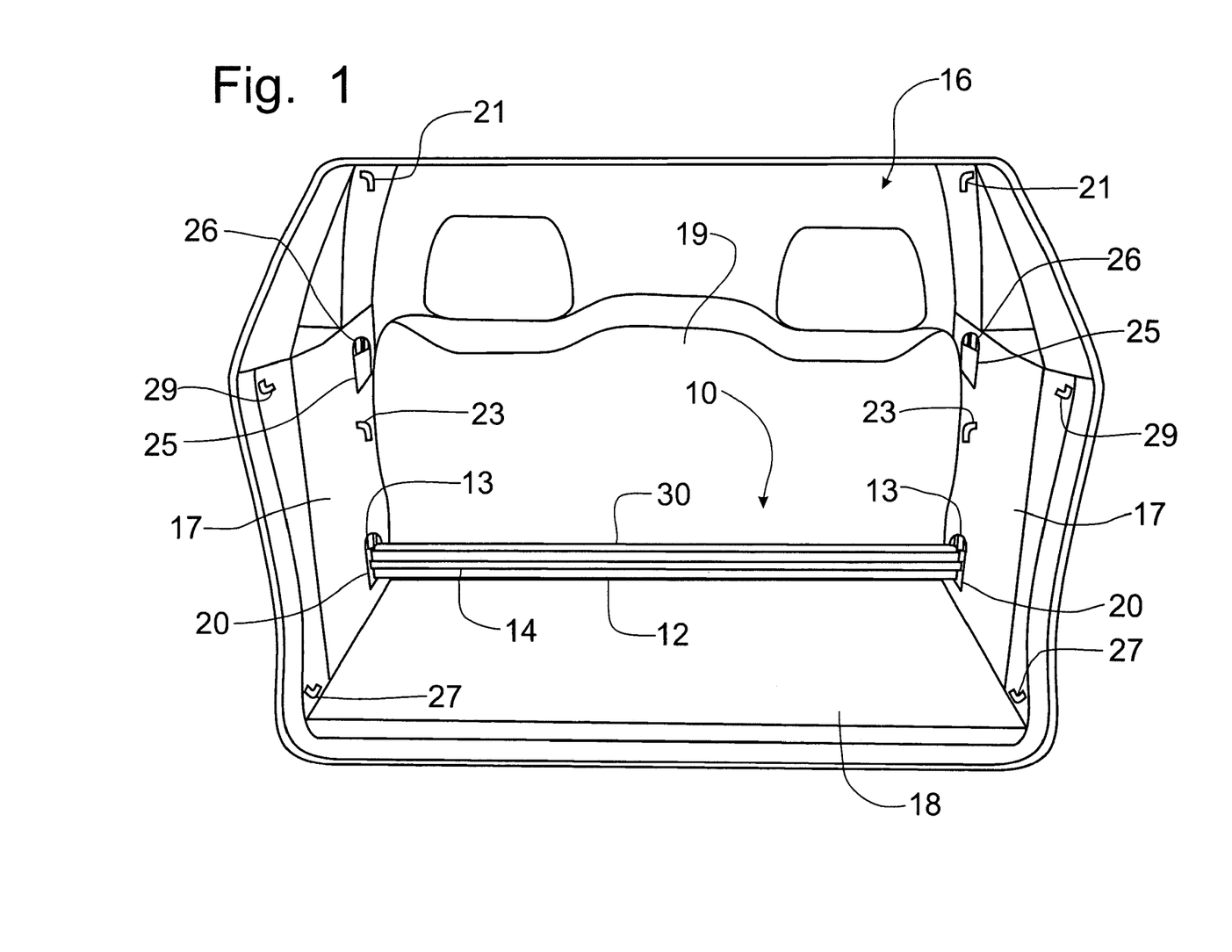
FIG. 1 is perspective view of a representative rear cargo area of a vehicle having a security screen apparatus incorporating the principles of the instant invention, the security screen being depicted in the compact storage configuration at the forward end of the rear cargo area adjacent the floor.
Figure 2:
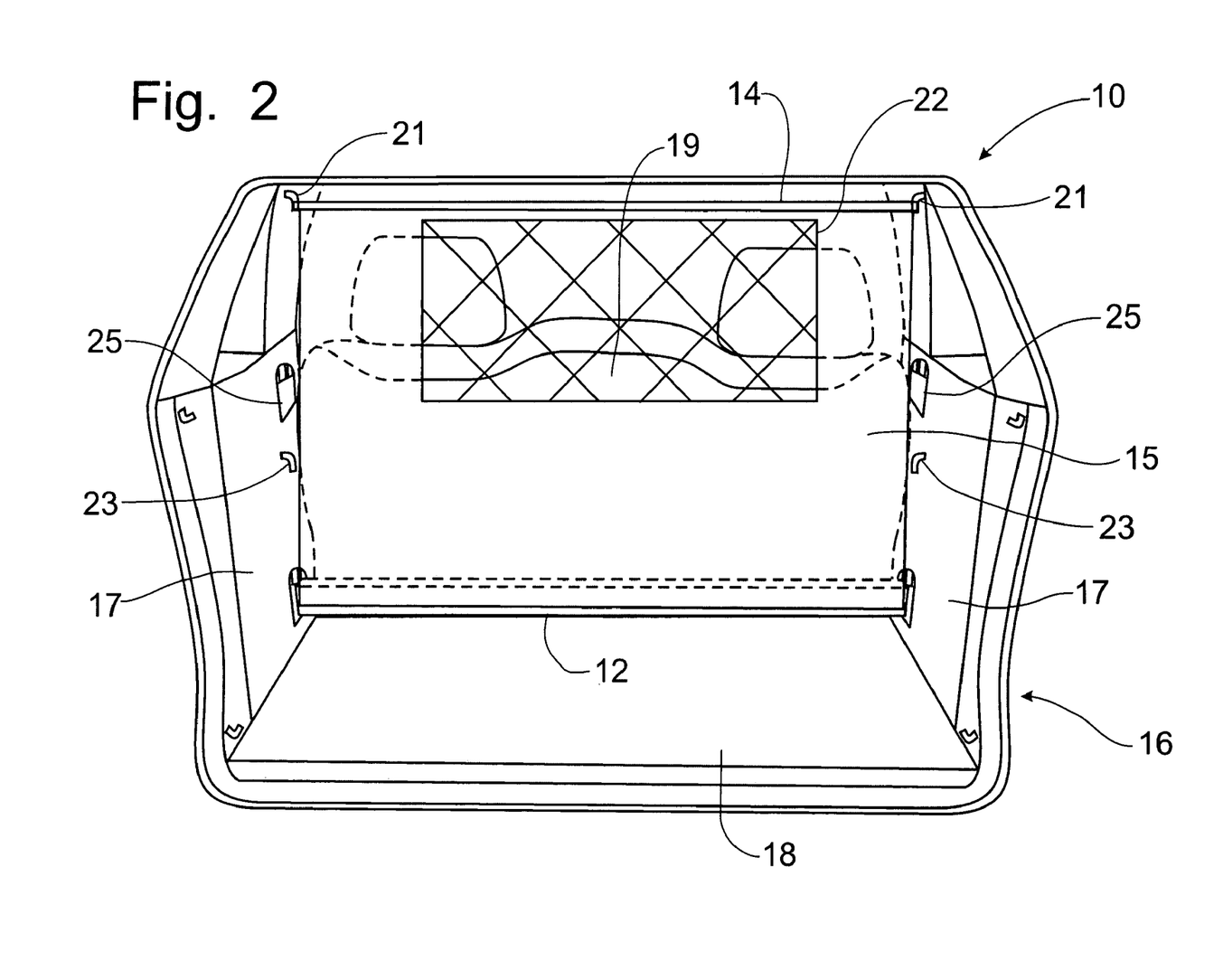
FIG. 2 is perspective view of the rear cargo area of a vehicle with the security screen being deployed as a vertical barrier between the forward passenger compartment and the rear cargo area.
Figure 3:
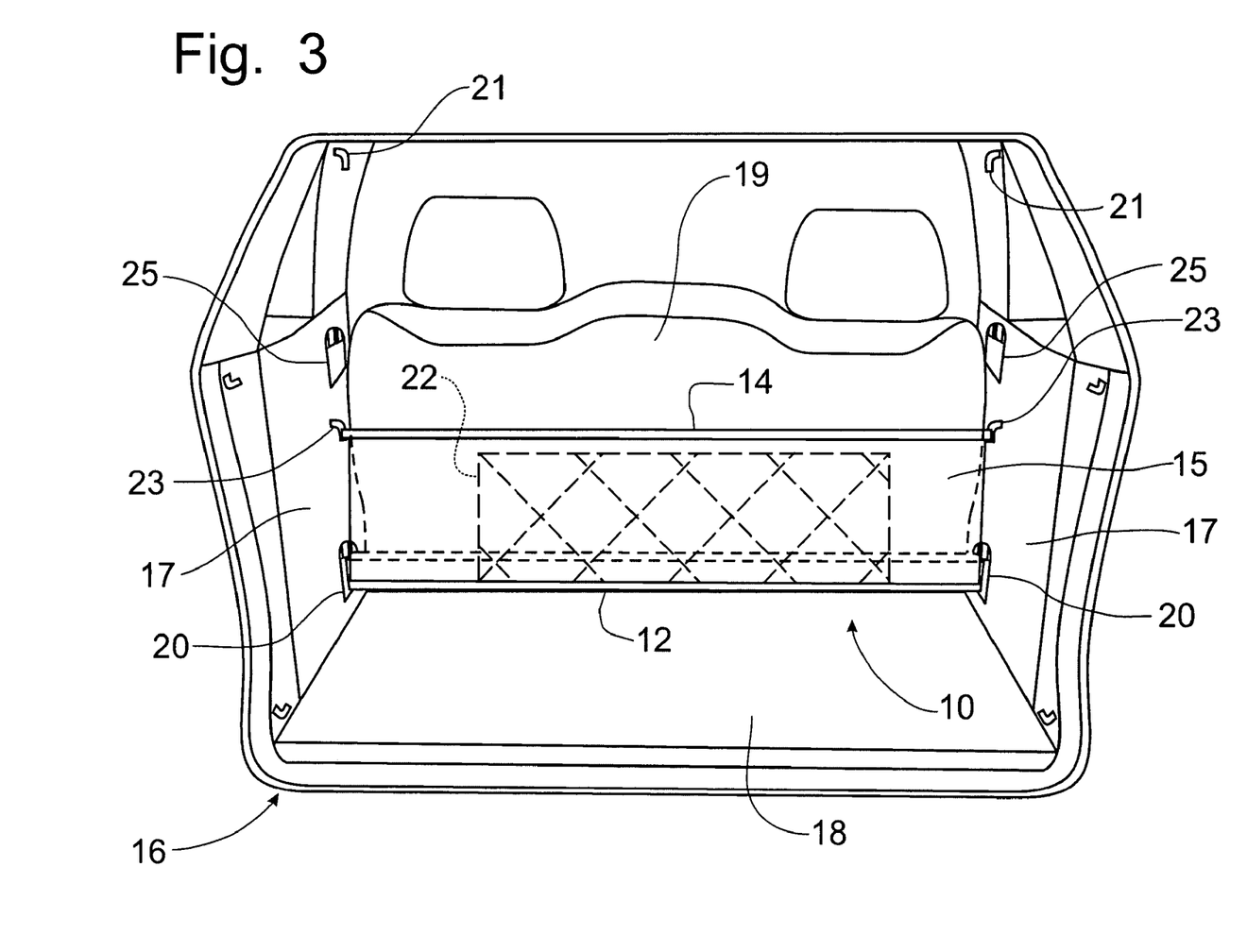
FIG. 3 is a perspective view of the rear cargo area with the security screen being deployed as a storage pocket for the rear seat of the passenger compartment.

As depicted in FIG. 1, the housing 12 will be located along the floor 18 to be positioned discretely out of the way of cargo that can be loaded into the rear cargo area 16. From this low storage position adjacent the floor 18, the screen can be extended vertically adjacent the rear seat 19, as is depicted in FIGS. 2 and 3. Attachment supports 21, preferably molded into the plastic sidewalls 17 adjacent the roof or ceiling of the vehicle, secure the handle 14 at a position shown in FIG. 2 corresponding to a full vertical extension of the screen 15 to form a barrier between the front passenger compartment forwardly of the rear seat 19, and the rear cargo area 16. Such a barrier can provide an effective animal screen.

Optionally, the screen 15 can be formed with a mesh-covered opening 22 to permit viewing through the screen 15 into the rear cargo area 16. If the mesh-covered opening 22 is utilized an optional cover (not shown) can be included to be attached, such as by hook-and-loop fastening devices, to the screen 15 to cover the mesh-covered opening when the screen 15 is utilized in a capacity other than as an animal barrier. The screen 15 could also be formed as a woven net or could be formed with some elasticity to enhance the use thereof as a cargo restraint, as is described in greater detail below.

As depicted in FIG. 3, the attachment of the handle 14 into attachment supports 23 located at a pre-selected height above the floor 18 would locate the vertically oriented screen 15 at a position to form a cargo pocket for the rear seat 19 of the passenger compartment. Such a configuration of the screen 15 can be readily accessed by a passenger sitting in the rear seat 19 and used to store objects for convenient retrieval by the passengers seated on the rear seat 19. As will be discussed in greater detail below with respect to the configuration depicted in FIG. 8 below, supplemental housing supports 25 are provided at a conventional height above the floor 18 at a forward position in the rear cargo area. The housing supports 25 can be provided with an integral attachment support 26 for alternative use to connect the handle 14 for the pocket formation instead of the attachment supports 23.

Figure 4:
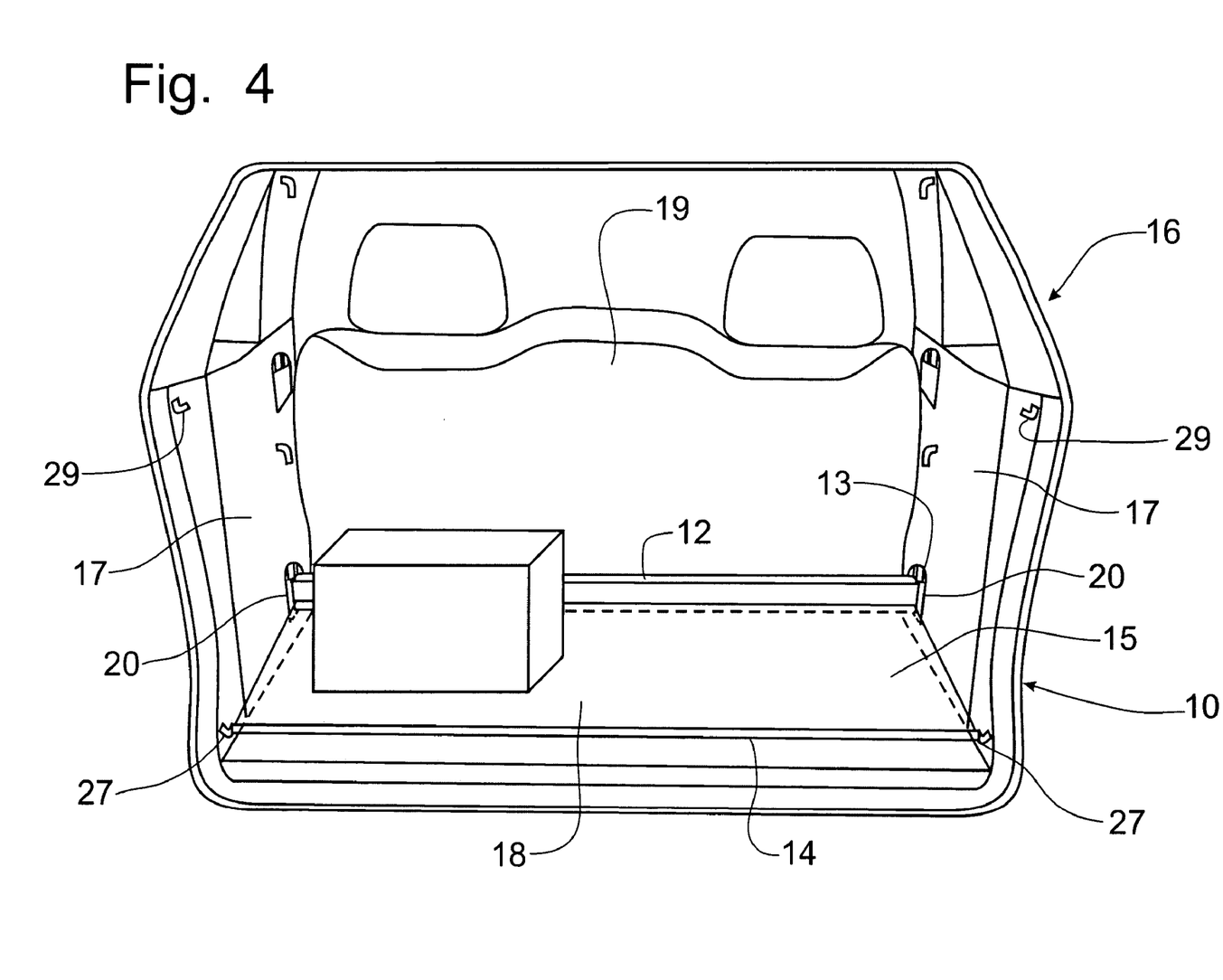
FIG. 4 is a perspective view of the rear cargo area with the security device being deployed as a cargo restraint along the floor of the rear cargo area.

From the position adjacent the floor 18 of the rear cargo area 16, the screen 15 can be deployed horizontally along the floor 18, as is depicted in FIG. 4. With this deployment, the handle 14 of the screen 15 can be connected to an attachment support 27 located adjacent the floor 18 at the rearwardmost part of the cargo area 16. Such a horizontally deployed screen 15 can be utilized as a carpet protector to support objects without permitting the objects to contact the carpet and cause soiling or destruction thereof. Alternatively, the cargo could be placed below the screen 15, supported on the floor 18, so that the screen 15, tensioned by the spring-loaded cylinder in the housing 12, would trap the cargo beneath the screen 15 and serve as a cargo restraint to prevent the cargo from moving along the floor 18.

Figure 5:
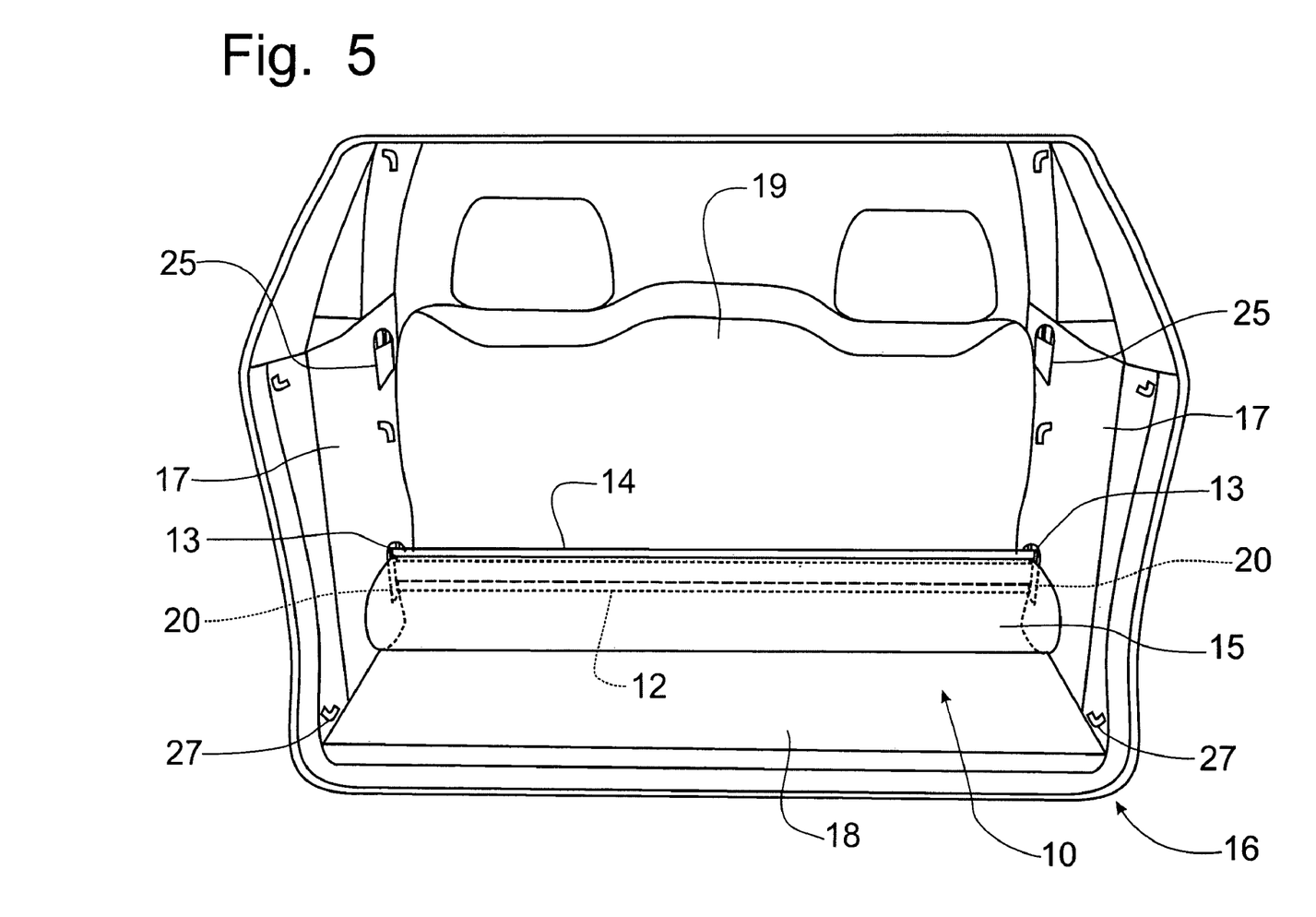
FIG. 5 is a perspective view of the rear cargo area with the security screen being deployed as a sleeve storage device with the cargo positioned adjacent the spring-loaded cylinder being enclosed within the security screen.

The housing 12 would preferably include an attachment support 13 to permit the handle 14 to be connected to the housing 12 so that the screen 15 can encircle and trap cargo or small objects placed adjacent the housing 12, as is depicted in FIG. 5. The screen 15 can be looped around the object, with the object seated on the screen 15 and the screen 15 then covered over top of the object and then fastened to the integral attachment support 13 on the housing 12, thus forming a wrap storage receptacle. Additionally, the screen 15 can be formed in a multi-layered configuration such that when extended horizontally, small and light articles could be placed between the layers of the screen 15 from the rear opening to define a sleeve storage receptacle.

Figure 8:
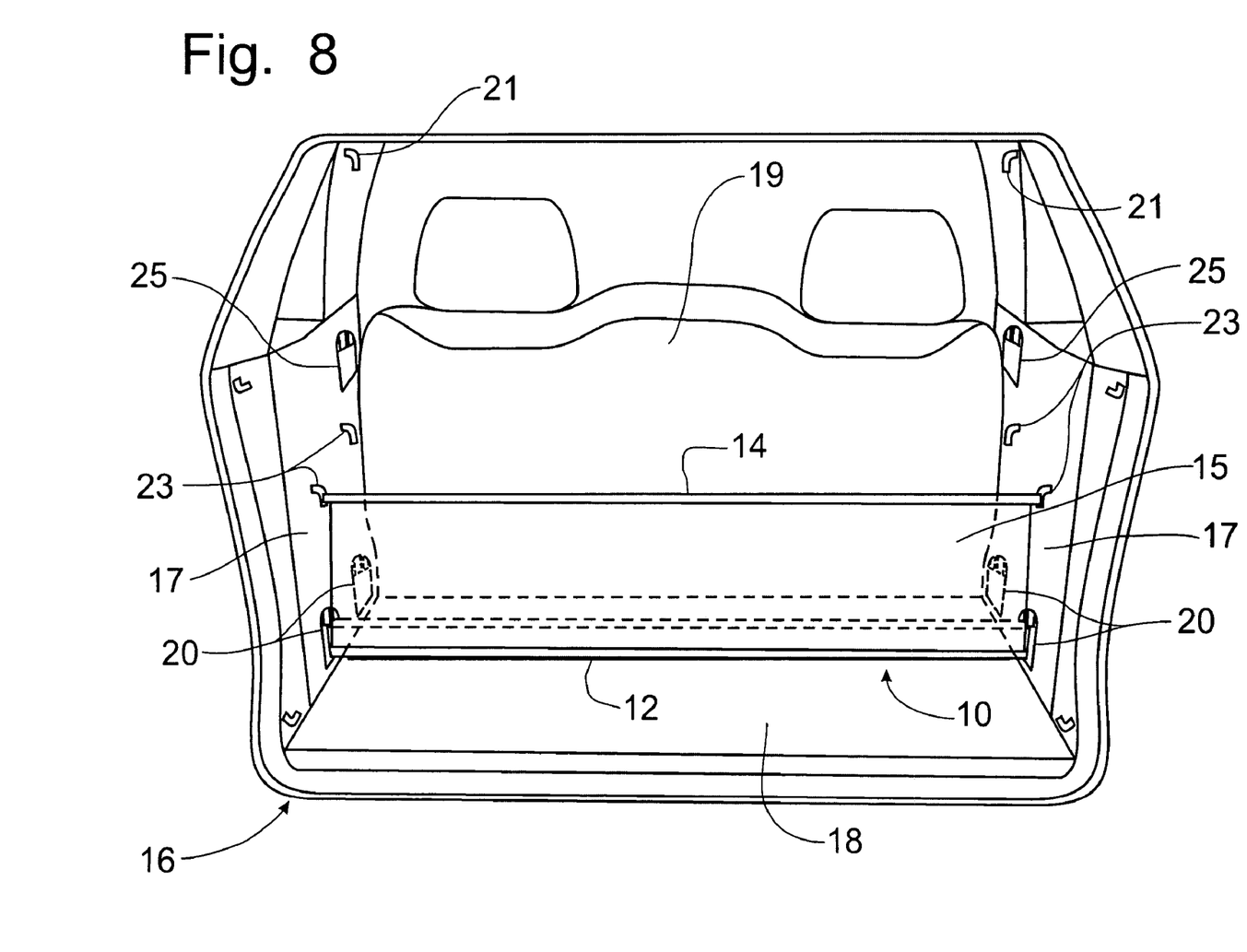
FIG. 8 is a perspective view of the rear cargo area with the security screen being deployed as a divider for the rear cargo area with the housing supported in supplemental supports and the screen raised partially to divide the forward portion of the rear cargo area from the rearward portion.

Although the preferred embodiment would have the housing 12 located only at the forward position depicted in FIG. 1, a relocation of the housing 12 to other optional housing supports 20 can provide additional functions for the apparatus 10. As is best seen in FIG. 8, the apparatus 10 can be utilized as a cargo area divider by mounting the housing 12 in optional supplemental supports 20 located at an immediate location along the respective sidewalls 17. The raising of the screen 15 into the corresponding supplemental attachment supports 23 divides the front portion of the cargo area 16 from the rearward portion.

Figure 6:
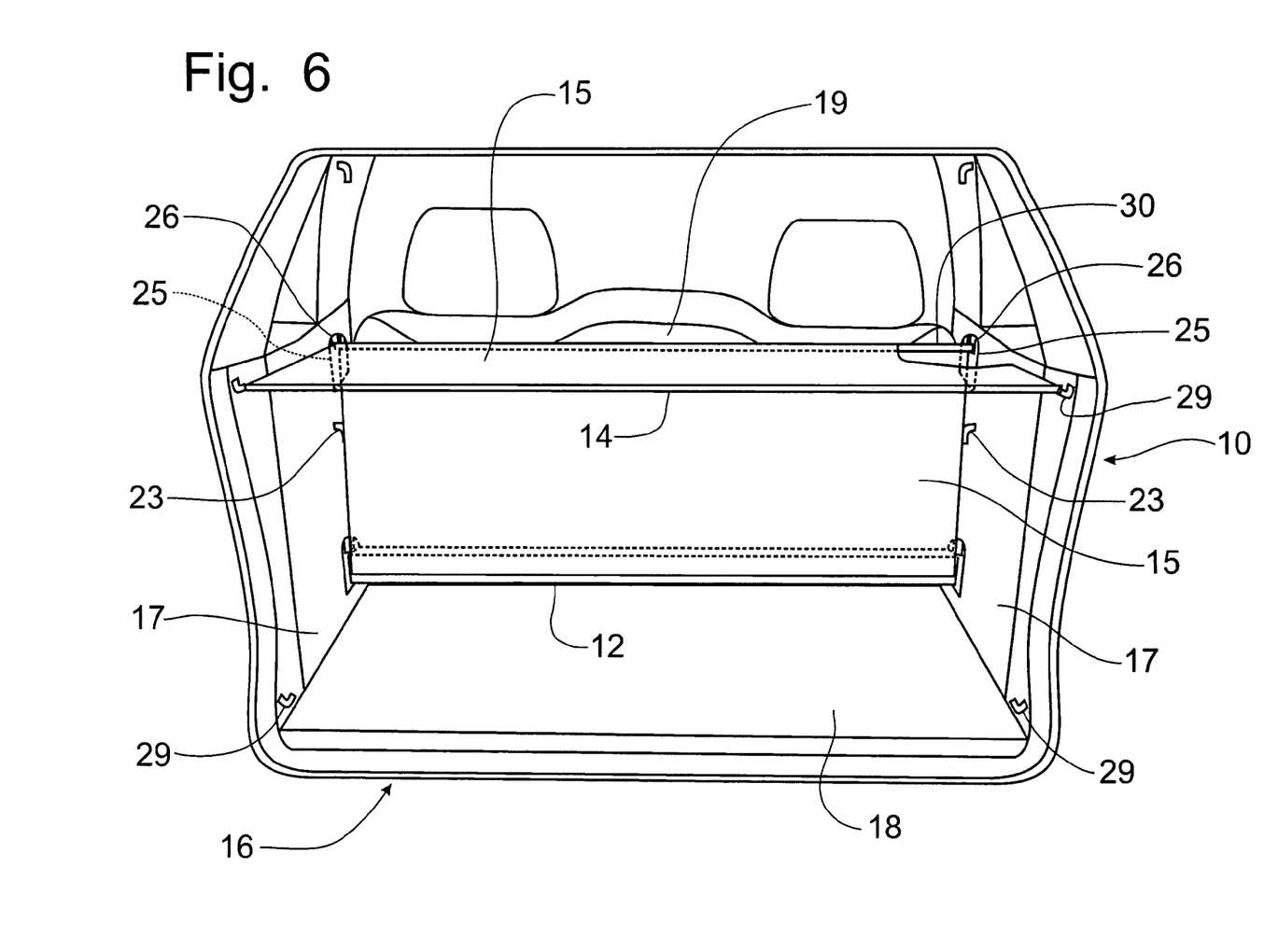
FIG. 6 is a perspective view of the rear cargo area with the security screen being deployed as an elevated horizontal cargo cover from the storage position, a portion of the security screen being broken away to depict the supplemental diversion shaft carried by the spring-loaded cylinder.
Figure 7:
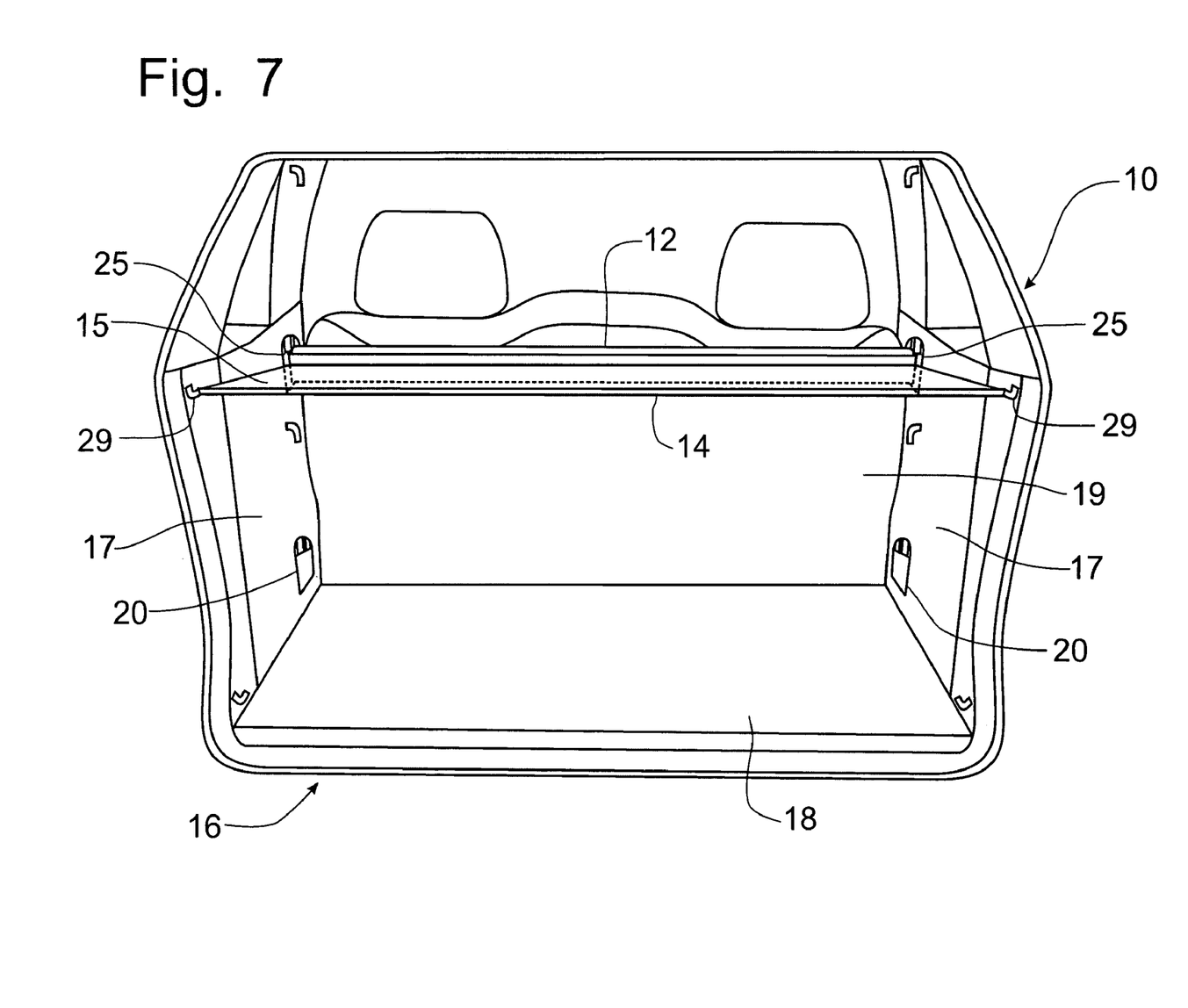
FIG. 7 is a perspective view of the rear cargo area with the security screen being deployed as a conventional horizontal cargo cover by re-positioning the spring-loaded cylinder at an elevated position at a forward position in the rear cargo area.

Referring now to FIGS. 6 and 7, the security screen apparatus 10 can also be used as an elevated rear cargo area privacy screen, as is the conventional use for the security screen apparatus 10. Preferably, the screen 15 can be extended from the housing 12 located in the lower housing supports 20 by extending the screen 15 vertically around a secondary handle member 30 and then forwardly for connection to the attachment supports 29 located at an upper rear position on the opposing sidewalls 17 of the rear cargo area 16. The secondary handle 30 can be conveniently stored on appropriate attachment supports 13 formed into the housing 12 until needed for deployment as described above. Instead of a secondary handle 30, the opposing sidewalls 17 can be equipped with attachment supports, such as a hook that engages an eye attached to the screen 15 at one of a plurality of positions along the lateral edge of the screen 15, which support the screen 15 for redirection toward the rear.

In the alternative, the housing 12 can be relocated from the housing supports 20 adjacent the floor 18 to the optional upper housing supports 25 so that the security screen apparatus 10 can function as a conventional security screen device by extending the screen 15 from the housing 12 in a generally horizontal direction to connect the handle 14 with the upper, rear attachment supports 29. One skilled in the art will also recognize that the screen 15, when deployed as a privacy screen as depicted in FIGS. 6 and 7, can be utilized as a cargo hammock to support cargo on top of the screen 15.

The attachment supports 21, 23, 24, 27 and 29 can be formed in a variety of ways, as is well known in the art, including a bayonet slot formed into the plastic inner sidewall 17 of the rear cargo area. The housing supports 20 and 25 can also be formed as part of the plastic inner sidewall 17 as a formed slot that conforms to the shape of the housing 12. Of course, the housing 12 can be completely removed from the vehicle and stored externally of the vehicle.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of examples, the apparatus 10 could be formed without a housing 12 such that the screen 15 would be wound around a sprung, longitudinally compressible cylinder that supported itself by a longitudinal spring expansion force against flat wall surfaces. The apparatus 10 could also be deployed in the passenger compartment of the vehicle such as forwardly of the rear seat back 19 to restrain cargo items that are positioned on the rear seat. One skilled in the art would recognize that such a configuration would require appropriate door pockets, etc. for support of the apparatus 10. Furthermore, the relocatable housing 12 could be supported on vertically mounted rails (not shown) that permit the housing 12 to be positioned at a variably selectable height instead of at predetermined positions.

The housing 12 could also be formed into the rear seat structure or below the floor level of the rear cargo area to reduce storage space requirements. Additionally, if the apparatus 10 were not made to be at substantially the full width of the rear cargo area, the housing supports would have to be supported other than on the sidewalls 17. Also, the movement of the screen 15 could be powered to facilitate ease of use.

Having thus described the invention, what is claimed is:

1. A screen system in combination with an automotive vehicle having a rear cargo area defined by transversely spaced, generally vertically oriented sidewalls, a upper roof, a lower floor, a forwardly positioned rear seat of a passenger compartment of said vehicle, and a rear wall, comprising:
a screen apparatus including a housing and a blind extendible from said housing, said housing being mounted in first housing supports on said opposing sidewalls to span the distance between said sidewalls, said first housing supports being located adjacent said rear seat and proximate to said floor to position said housing adjacent said floor, said sidewalls having second housing supports positioned above said floor to permit a selective relocation of said housing at a second position elevated above said floor; and said sidewalls having attachment supports for engagement with said blind to restrain said blind in an extended position with respect to said housing including a pair of opposing intermediate attachment supports positioned between said first and second housing supports.

2. The screen system of claim 1 wherein said housing supports a spring device to urge said blind into a retracted position within said housing, said blind including a handle engagable with said attachment supports to restrain said blind in a corresponding extended position.

3. The screen system of claim 2 wherein said attachment supports are provided in opposing pairs for engagement with opposite ends of said handle, said attachment supports being positioned at multiple locations on said sidewalls to provide multiple corresponding extended positions, said attachment supports comprising:
- a first pair of attachment supports located vertically above said housing adjacent said roof;
- a second pair of attachment supports located adjacent said rear wall proximate to said floor; and
- a third pair of attachment supports located adjacent said rear wall and spaced above said second pair of attachment supports.

4. The screen system of claim 3 wherein said second housing supports incorporate a fourth pair of opposed attachment supports.

5. In an automobile having a rear cargo area defined by transversely spaced, generally vertically oriented sidewalls, a upper roof, a lower floor, a rear seat of a passenger compartment of said automobile, and a rear wall, the improvement comprising:
- a screen apparatus including:
  - an elongated housing mounted in first housing supports on said opposing sidewalls to span the distance between said sidewalls, said first housing supports being located adjacent said rear seat and proximate to said floor to position said housing adjacent said floor, said sidewalls having second housing supports positioned above said floor to permit a selective relocation of said housing at a second position elevated above said floor;
  - a blind extendible from said housing, said blind including a handle; and
  - a tensioning device supported in said housing for engagement with said blind to urge a retraction of said blind into said housing;
- a first pair of attachment supports located vertically above said first housing supports adjacent said roof for selective engagement with said handle to restrain said blind in a vertically extended position with respect to said housing to form a barrier between said rear cargo area and said passenger compartment;
- a second pair of attachment supports located adjacent said rear wall proximate to said floor for selective engagement with said handle to restrain said blind in a horizontally extended position with respect to said housing when mounted in said first housing supports to form a covering over said floor;
- a third pair of attachment supports located adjacent said rear wall and spaced above said second pair of attachment supports for selective engagement with said handle to restrain said blind in a generally horizontally extended position elevated above said floor when said housing is selectively mounted in said second housing supports; and
- an intermediate pair of attachment supports positioned between said first and second housing supports for selective engagement with said handle to restrain said blind in a generally vertically extended position with said handle being at a height to form a storage pocket against said rear seat.

6. The automobile of claim 5 wherein said second housing supports incorporate a fourth pair of opposed attachment supports.

7. The automobile of claim 6 wherein said blind is extendible from said housing mounted in said first housing supports, around a secondary handle mounted in said fourth pair of attachment supports and restrained by connecting said handle into said third pair of attachment supports to restrain said blind in a horizontal orientation elevated above said floor to form a privacy cover for said rear cargo area.

8. The automobile of claim 7 wherein said housing incorporates a sixth pair of attachment supports to permit said blind to encircle objects adjacent said housing and to connect said handle to said sixth pair of attachment supports to wrap around said objects.

9. The automobile of claim 5 further comprising:
- third housing supports located proximate to said floor between said first housing supports and said second attachment supports; and
- second intermediate attachment supports located in said opposing sidewalls vertically above said third housing supports for selective engagement with said handle to restrain said blind in a vertically extended position with respect to said housing being mounted in said third housing supports to form a rear cargo area divider.

10. The automobile of claim 9 wherein said third housing supports are positioned approximately midway between said first housing supports and said second attachment supports to divide said rear cargo area into a front portion and a rearward portion.

11. In an automobile having a rear cargo area defined by transversely spaced, generally vertically oriented sidewalls, a upper roof, a lower floor, a rear seat of a passenger compartment of said automobile, and a rear wall, the improvement comprising:
- a screen apparatus including an elongated housing; a blind extendible from said housing, said blind including a handle; and a tensioning device supported in said housing for engagement with said blind to urge a retraction of said blind into said housing;
- said sidewalls including multiple housing supports for selectively mounting said housing for deployment of said blind, including:
  - first housing supports located adjacent said rear seat and proximate to said floor to position said housing adjacent said floor;
  - second housing supports positioned vertically above said first housing supports to permit a selective relocation of said housing at a second position elevated above said floor; and
  - third housing supports located proximate to said floor and rearwardly of said first housing supports to permit a selective relocation of said housing at a second position adjacent said floor;
- said sidewalls further including multiple attachment supports for selective engagement with said handle to restrain said blind in an extended position relative to said housing, said multiple attachment supports including:

a first pair of attachment supports located vertically above said first housing supports adjacent said roof for selective engagement with said handle to restrain said blind in a vertically extended position with respect to said housing when mounted selectively in said first and second housing supports to form a barrier between said rear cargo area and said passenger compartment;

a second pair of attachment supports located adjacent said rear wall proximate to said floor for selective engagement with said handle to restrain said blind in a horizontally extended position with respect to said housing when mounted in said first housing supports to form a covering over said floor;

a third pair of attachment supports located adjacent said rear wall and spaced above said second pair of attachment supports for selective engagement with said handle to restrain said blind in a generally horizontally extended position elevated above said floor when said housing is selectively mounted in said second housing supports; and a fourth pair of attachment supports located vertically above said third housing supports for selective engagement with said handle to restrain said blind in a vertically extended position with respect to said housing being mounted in said third housing supports to form a rear cargo area divider.

12. The automobile of claim 11 further comprising a fifth pair of attachment supports positioned between said first and second housing supports for selective engagement with said handle to restrain said blind in a generally vertically extended position with said handle being at a height to form a storage pocket against said rear seat.

13. The automobile of claim 11 wherein said third housing supports are positioned approximately midway between said first housing supports and said second attachment supports to divide said rear cargo area into a front portion and a rearward portion.

* * * * *